US011238159B1

(12) United States Patent
Clark-Lindh et al.

(10) Patent No.: US 11,238,159 B1
(45) Date of Patent: Feb. 1, 2022

(54) ARTIFICIAL REALITY SYSTEM WITH VERIFIED BOOT SEQUENCES

(71) Applicant: Facebook Technologies, LLC, Menlo Park, CA (US)

(72) Inventors: Teman David Clark-Lindh, Seattle, WA (US); Benjamin Joseph Mossawir, San Carlos, CA (US); David Stanley Bormann, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 38 days.

(21) Appl. No.: 16/795,254

(22) Filed: Feb. 19, 2020

Related U.S. Application Data

(60) Provisional application No. 62/932,838, filed on Nov. 8, 2019.

(51) Int. Cl.
*G06F 21/57* (2013.01)
*G06F 15/78* (2006.01)
*H04N 13/344* (2018.01)
*H04L 29/06* (2006.01)

(52) U.S. Cl.
CPC ........ *G06F 21/572* (2013.01); *G06F 15/7821* (2013.01); *G06F 21/575* (2013.01); *H04N 13/344* (2018.05); *H04L 67/38* (2013.01)

(58) Field of Classification Search
CPC .. G05F 21/572; G05F 21/575; G05F 15/7821; H04N 13/344; H04L 67/38; G06F 21/572; G06F 21/575; G06F 15/7821
See application file for complete search history.

(56) References Cited

U.S. PATENT DOCUMENTS

| 2015/0169875 | A1* | 6/2015 | Ide | G06F 8/63 |
| | | | | 713/2 |
| 2016/0125187 | A1* | 5/2016 | Oxford | H04L 63/0442 |
| | | | | 713/2 |
| 2017/0147356 | A1* | 5/2017 | Kotary | G06F 3/068 |
| 2020/0380585 | A1* | 12/2020 | Hare | G06F 21/74 |

* cited by examiner

*Primary Examiner* — Gary Collins
(74) *Attorney, Agent, or Firm* — Shumaker & Sieffert, P.A.

(57) ABSTRACT

In general, techniques are described for improving security of a boot sequence of an application processor. In some examples, a computing device includes a first processor coupled to a first storage device, the first processor and first storage device configured to obtain firmware from a storage device external to the first processor; run a verification routine on the firmware; and in response to validation of the firmware with the verification routine, communicate the firmware to a second processor; and the second processor coupled to a second storage device, the second processor and second storage device configured to load the firmware.

19 Claims, 11 Drawing Sheets

ARTIFICIAL REALITY SYSTEM WITH VERIFIED BOOT SEQUENCES

This application claims the benefit of U.S. Provisional Patent Application No. 62/932,838, filed Nov. 8, 2019, the entire contents of which are incorporated herein by reference.

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, techniques are described for improving security of a boot sequence of an application processor. The techniques may be implemented in Augmented Reality/Virtual Reality system devices, such as a peripheral device operating as a co-processing AR/VR device when paired with one or more head-mounted displays (HMDs) and configured to display virtual content. For example, the peripheral device and each HMD may each include one or more System on a Chip (SoC) integrated circuits configured to support artificial reality/virtual reality applications. Such SoCs may include those operating as or supporting a co-application processor, sensor aggregator, display SoC, etc. The boot sequence for processors, whether operating independently or as part of a SoC, includes loading and verifying logic (e.g., firmware) into a storage device (e.g., a flash device, such as an embedded Multi-Media Controller (eMMC) device or a Universal Flash Storage (UFS) device).

Boot sequences can be exploited to run arbitrary code on a computing device, which leave the computing device user's information susceptible to misappropriation. To illustrate, an attacker may find an exploit either in the verification process of the regular secure boot flow or in a USB-based recovery procedure and utilize the exploit to surreptitiously access the computing device by inserting arbitrary code into the boot sequence for execution. Some exploits may result from external application processor (AP) vendors using existing read-only memory (ROM) designs and exploitable storage protocols.

In some examples, an SoC manages a boot sequence of an application processor to improve boot sequence security for the application processor. For example, the SoC may control the boot sequence by representing, to the application processor, a firmware device after having validated firmware obtained from the firmware device. The SoC may independently validate the firmware as being an authorized version. The SoC may also validate physical traces between itself and the application processor or between itself and the storage device. In response to validating the firmware, physical traces, or other properties of the system, the SoC boots the application processor, which requests the firmware from the SoC. The SoC reads the firmware from the storage device and provides the firmware to the application processor for loading according to the boot sequence.

The techniques may provide one or more technical advantages or improvements that provide at least one practical application. For example, by verifying the firmware being used in the boot sequence, the SoC may improve the security of the boot sequence of the application processor. To take advantage of an exploit in the application processor boot sequence, a malicious entity would need to either (1) exploit both the SoC and the application processor, which is more difficult that exploiting the application processor alone, or (2) modify the circuit board in a non-trivial way in order to bypass the SoC to load the firmware directly from the storage device. The techniques may be applied in combination with (e.g., prior to) other verification processes for securing the boot sequence for the application processor.

In one example, a method for securing a boot sequence, the method comprising obtaining, by a first processor, firmware from a storage device external to the first processor, running, by the first processor, a verification routine on the firmware, in response to validating the firmware with the verification routine, communicating, by the first processor, the firmware to a second processor, and loading, by the second processor, the firmware. In one example, an apparatus configured to perform any of the methods described in the present disclosure. In one example, a computing device configured to perform any of the methods of the claims recited herein.

In another example, an artificial reality system comprises a first System-on-Chip (SoC) comprising a first processor and an embedded storage device; a storage device external to the first SoC; a second SoC comprising a second processor, wherein the first processor is configured to obtain firmware from the storage device, wherein the first processor is configured to, in response to validating the firmware with the verification routine, initiate a boot of the second processor, wherein the second processor is configured to obtain the firmware from the embedded storage device of the first SoC and execute the firmware.

In another example, a computing device comprises a first processor coupled to a first storage device, the first processor and first storage device configured to: obtain firmware from a storage device external to the first processor; run a verification routine on the firmware; and in response to validation of the firmware with the verification routine, communicate the firmware to a second processor; and the second processor coupled to a second storage device, the second processor and second storage device configured to load the firmware.

In another example, an artificial reality system comprises a storage device; and one or more processors connected to the storage device and configured to perform any of the methods of the claims recited herein or any of the processes, techniques, or procedures described herein.

Other examples include methods, devices, devices comprising means, and computer-readable storage media for performing any of the methods of the claims, or any of the processes, techniques, or procedures described herein.

Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters refer to like elements throughout the figures and text.

DETAILED DESCRIPTION

Figure 1A:
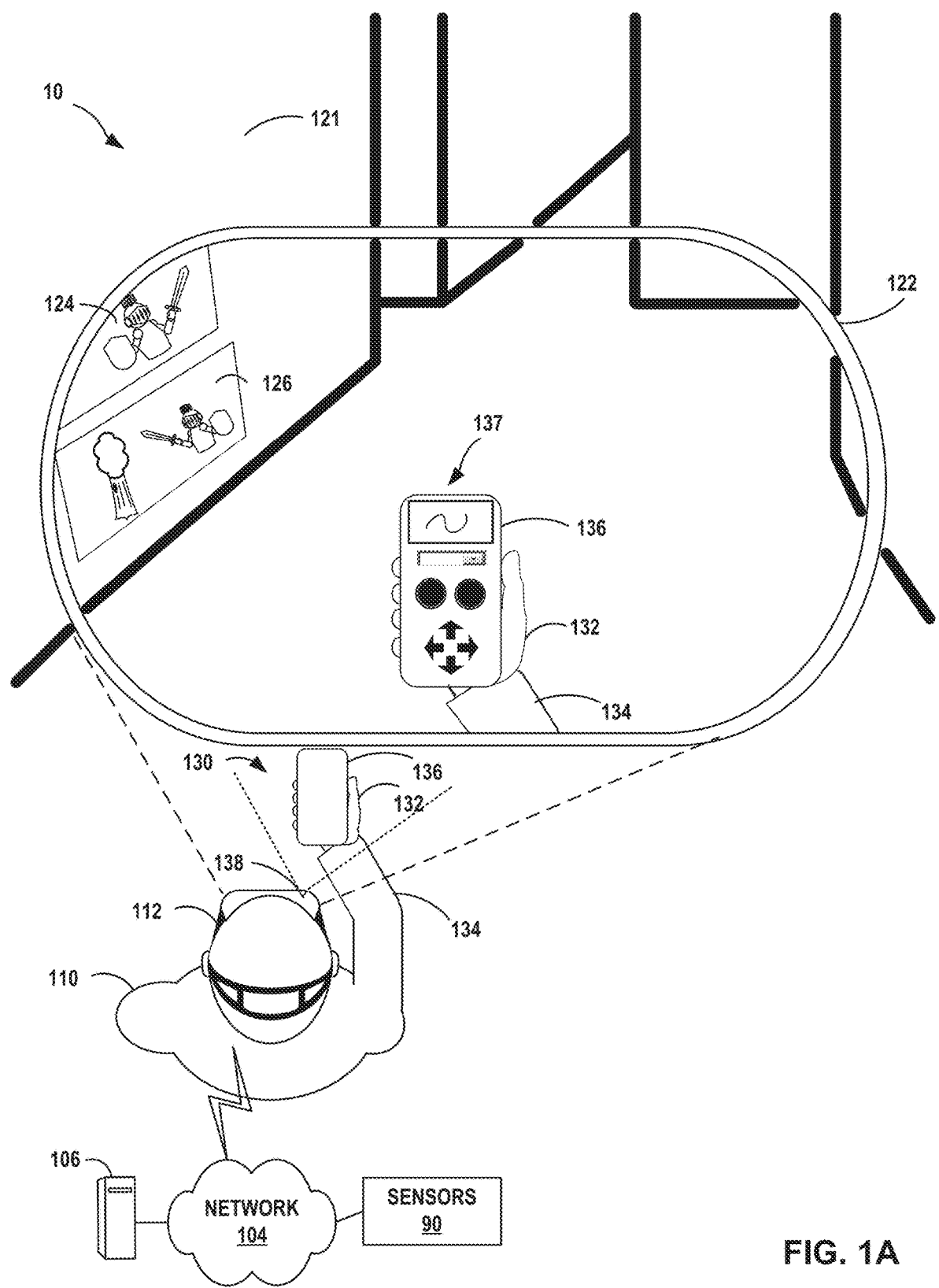
FIG. 1A is a block diagram depicting an example multi-device artificial reality system that facilitates secure booting of artificial reality applications, in accordance with the techniques described in this disclosure.

FIG. 1A is a block diagram depicting an example multi-device artificial reality system that facilitates secure booting of artificial reality applications, in accordance with the techniques described in this disclosure. In the example of FIG. 1A, artificial reality system 10 includes HMD 112, peripheral device 136, and may in some examples include one or more external sensors 90 and/or console 106.

A typical boot sequence for loading and executing an artificial reality application can be easily exploited, which can leave devices of artificial reality system 10 and any information stored thereon susceptible to misappropriation. To illustrate, an attacker may find an exploit either in the verification process of a regular secure boot flow or in a USB-based recovery procedure and utilize the exploit to surreptitiously access peripheral device 136 by inserting arbitrary code into the boot sequence for execution. Some exploits may result from external application processor (AP) vendors using existing ROM designs and exploitable storage protocols.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., System on a Chip (SOC)) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface and performs an action that is rendered to HMD 112.

In some example implementations, as described herein, peripheral device 136 and HMD 112 may each include one or more System on a Chip (SoC) integrated circuits configured to support an artificial reality/virtual reality application, such as SoCs operating as co-application processors, sensor aggregators, display controllers, etc. The boot sequence for the above-mentioned artificial reality/virtual reality application will include loading and verifying logic (e.g., firmware) into a storage device (e.g., a flash memory device, such as an embedded Multi-Media Controller (eMMC) device or a Universal Flash Storage (UFS) device). When peripheral device 136 and/or HMD 112 are powered on, peripheral device 136 and/or HMD 112 may initiate application boot sequences and engage various firmware in booting (e.g., secure booting) corresponding artificial reality applications.

In accordance with the techniques of this disclosure, an SoC of artificial reality system 10 may manage a boot sequence of an application processor of artificial reality system 10 to improve boot sequence security for the application processor. For example, the SoC may control the boot sequence by booting the application processor and by representing itself as the firmware to the application processor.

For example, the SoC may reside on data lines connecting the application processor and a storage device storing the firmware. The SoC may obtain the firmware from the storage device and then, provide the firmware to the application processor for loading using a storage protocol. The SoC may independently validate the firmware as being an authorized version. The SoC may also validate physical traces between itself and the application processor or between itself and the storage device. In response to validating the firmware, traces, or other properties of the system, the SoC boots the application processor, which requests the firmware from the SoC. The SoC reads the firmware from the storage device and provides the firmware to the application processor for loading according to the boot sequence.

Figure 1B:
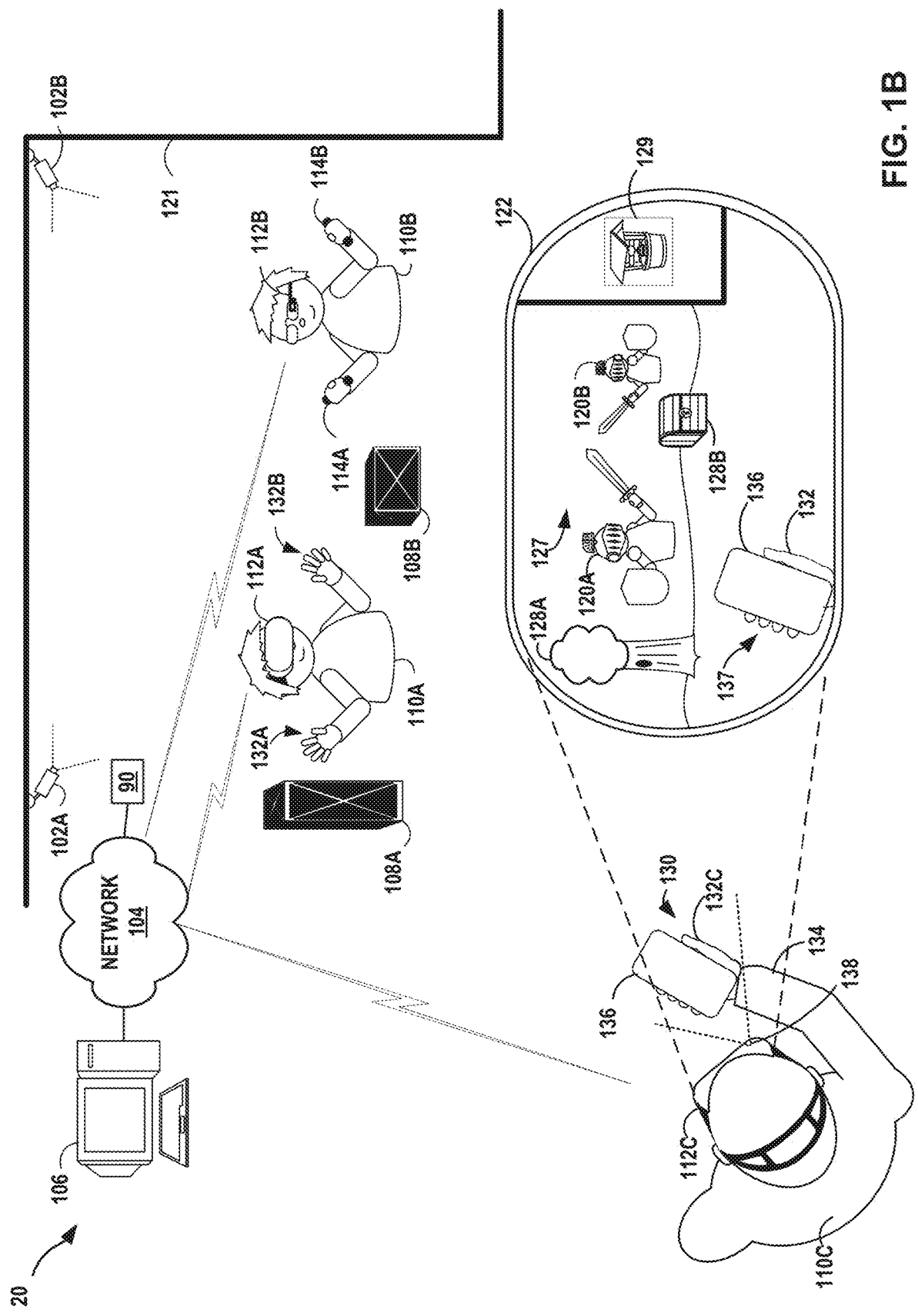
FIG. 1B is a block diagram depicting an example multi-device artificial reality system that facilitates secure booting of artificial reality applications, in accordance with techniques described in this disclosure.

FIG. 1B is a block diagram depicting an example multi-device artificial reality system that facilitates secure booting of artificial reality applications in accordance with the techniques described in this disclosure. Similar to artificial reality system 10 of FIG. 1A, in some examples, artificial reality system 20 of FIG. 1B may generate and render virtual content items with respect to a virtual surface within a multi-user artificial reality environment. Artificial reality system 20 may also, in various examples, generate and render certain virtual content items and/or graphical user interface elements to a user in response to detection of one or more particular interactions with peripheral device 136 by the user. For example, the peripheral device 136 may act as a stage device for the user to "stage" or otherwise interact with a virtual surface.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122.

HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In a manner similar to the examples discussed above with respect to FIG. 1A, console 106 and/or HMD 112C of artificial reality system 20 generates and renders a virtual surface comprising virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of wall 121 associated with virtual content item 129 comes within field of view 130 of HMD 112C. As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and controllers 114 may each include one or more SoC integrated circuits configured to enable an operating environment for artificial reality applications. When devices are first powered on, the devices may initiate a secure boot wrapper for use when booting artificial reality applications. When the controllers 114 and HMD 112B are powered on and perform a secure boot, each of the devices may mutually authenticate the SoCs of the devices based on the pairing certificate stored in the NVM of each device.

In accordance with the techniques of this disclosure, an SoC of artificial reality system 20 may manage a boot sequence of an application processor of artificial reality system 20 to improve boot sequence security for the application processor. For example, the SoC may control the boot sequence by representing a boot processor as a storage device that stores firmware for the application processor and by verifying the firmware for safe loading by the application processor from the storage device. The SoC may independently validate the firmware as being an authorized version. The SoC may also validate traces between itself and the application processor or between itself and the storage device. In response to validating the firmware, traces, or other properties of the system, the SoC boots the application processor, which requests the firmware from the SoC. The SoC reads the firmware from the storage device and provides the firmware to the application processor for loading according to the boot sequence.

Figure 2A:
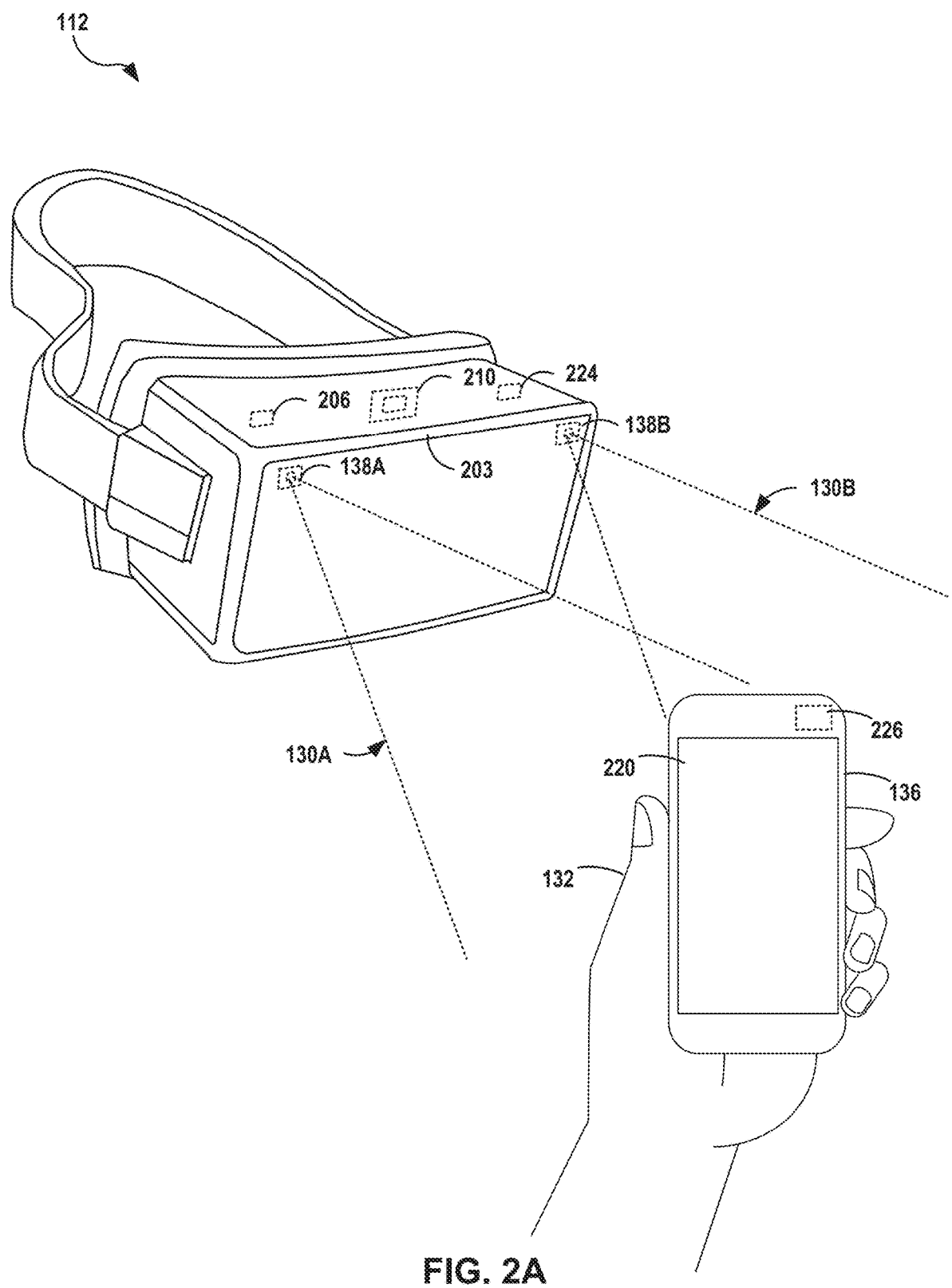
FIG. 2A is a block diagram depicting an example HMD and an example peripheral device that facilitates secure booting of artificial reality applications, in accordance with techniques described in this disclosure.

FIG. 2A is an illustration depicting an example HMD 112 and an example peripheral device 136 that provide secure, privacy-preserving device attestation and mutual authentication, in accordance with techniques described in this disclosure. HMD 112 of FIG. 2A may be an example of any of HMDs 112 of FIGS. 1A and 1B. HMD 112 may be part of an artificial reality system, such as artificial reality systems 10, 20 of FIG. 1A, 1B, or may operate as a stand-alone, mobile artificial reality system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, control unit 210 is configured to, based on the sensed data (e.g., image data captured by image capture devices 138 and/or 102, position information from GPS sensors), generate and render for display on display 203 a virtual surface comprising one or more virtual content items (e.g., virtual content items 124, 126 of FIG. 1A) associated with a position contained within field of view 130A, 130B of image capture devices 138. As explained with reference to FIGS. 1A-1B, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view 130A, 130B. In some examples, a virtual surface is associated with a position on a planar or other surface (e.g., a wall), and control unit 210 will generate and render the portions of any virtual content items contained within that virtual surface when those portions are within field of view 130A, 130B.

In one example, control unit 210 is configured to, based on the sensed data, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). Control unit 210 may perform object recognition within image data captured by image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and/or a virtual surface (including any virtual content items) and enable the user to interface with that UI menu and/or virtual surface based on detection of a user interface gesture, selection gesture, stamping gesture, translation gesture, rotation gesture, and drawing gesture performed by the user with respect to the peripheral device, as described in further detail below.

In one example, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on touchscreen 220 and detect user input (e.g., touch or hover input) on touchscreen 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, peripheral device can include one or more input devices (e.g., buttons, trackball, scroll wheel) for interacting with virtual content (e.g., to select a virtual UI element, scroll through virtual UI elements).

In some examples, HMD 112 includes a security processor 224 for secure device attestation and mutual authentication of HMD 112 and other devices of the AR system. When HMD 112 is powered on and performs a secure boot, security processor 224 may authenticate SoCs of HMD 112 as an application processor in HMD 112 loads applicable firmware. Security processor 224 may establish a secure communication channel between HMD 112 and peripheral device 136. In one example, peripheral device 136 includes a security processor 226 for secure device attestation and mutual authentication of peripheral device 136 and other devices of the AR system. When peripheral device 136 is powered on and performs a secure boot, security processor 226 may authenticate SoCs of peripheral device 136 as an application processor in peripheral device 136 loads applicable firmware. As described above, security processor 226 may establish a secure communication channel between peripheral device 136 and HMD 112.

In accordance with the techniques of this disclosure, an SoC of peripheral device 136 may manage a boot sequence of an application processor of peripheral device 136 to improve boot sequence security for the application processor. For example, the SoC may control the boot sequence by verifying the firmware required for the boot sequence prior to communicating the firmware from a secure embedded storage device to the application processor for loading. The SoC may independently validate the firmware as being an authorized version. The SoC may also validate traces between itself and the application processor or between itself and the secure embedded storage device. In response to validating the firmware, traces, or other properties of the system, the SoC boots the application processor, which requests the firmware from an external storage device of the SoC. Because the SoC resides between the application processor and the external storage device, the SoC may operate as the external storage device. The SoC reads the firmware from the secure embedded storage device and provides the firmware to the application processor for loading according to the boot sequence. The techniques described above with respect to SoCs and processors of peripheral device 136 may also be implemented in SoCs and processors of HMD 112.

Figure 2B:
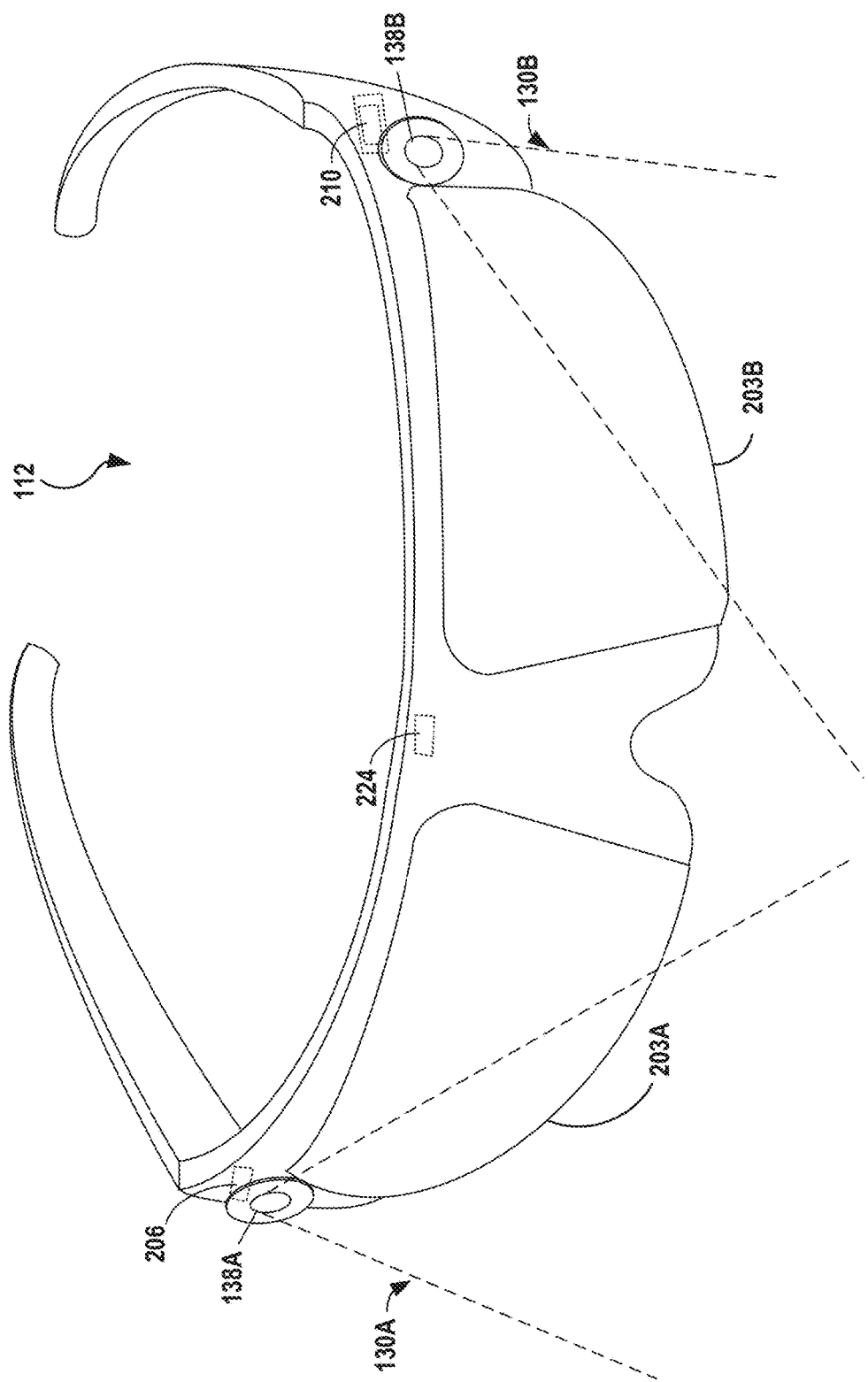
FIG. 2B is a block diagram depicting another example HMD, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIG. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

In accordance with the techniques of this disclosure, an SoC of peripheral device 136 may manage a boot sequence of an application processor of peripheral device 136 to improve boot sequence security for the application processor. For example, the SoC may control the boot sequence by obtaining firmware image files from a storage device that stores firmware for the application processor and verifying the firmware prior to loading that firmware onto the application processor. The SoC may independently validate the firmware as being an authorized version. The SoC may also verify traces between itself and the application processor or between itself and the storage device. In response to verifying the firmware, traces, or other properties of the system, the SoC boots the application processor, which requests the firmware from the SoC. The SoC reads the firmware from the storage device and, representing that storage device, provides the firmware to the application processor for loading according to the boot sequence. The techniques described above with respect to SoCs and processors of peripheral device 136 may also be implemented in SoCs and processors of HMD 112.

Figure 3:
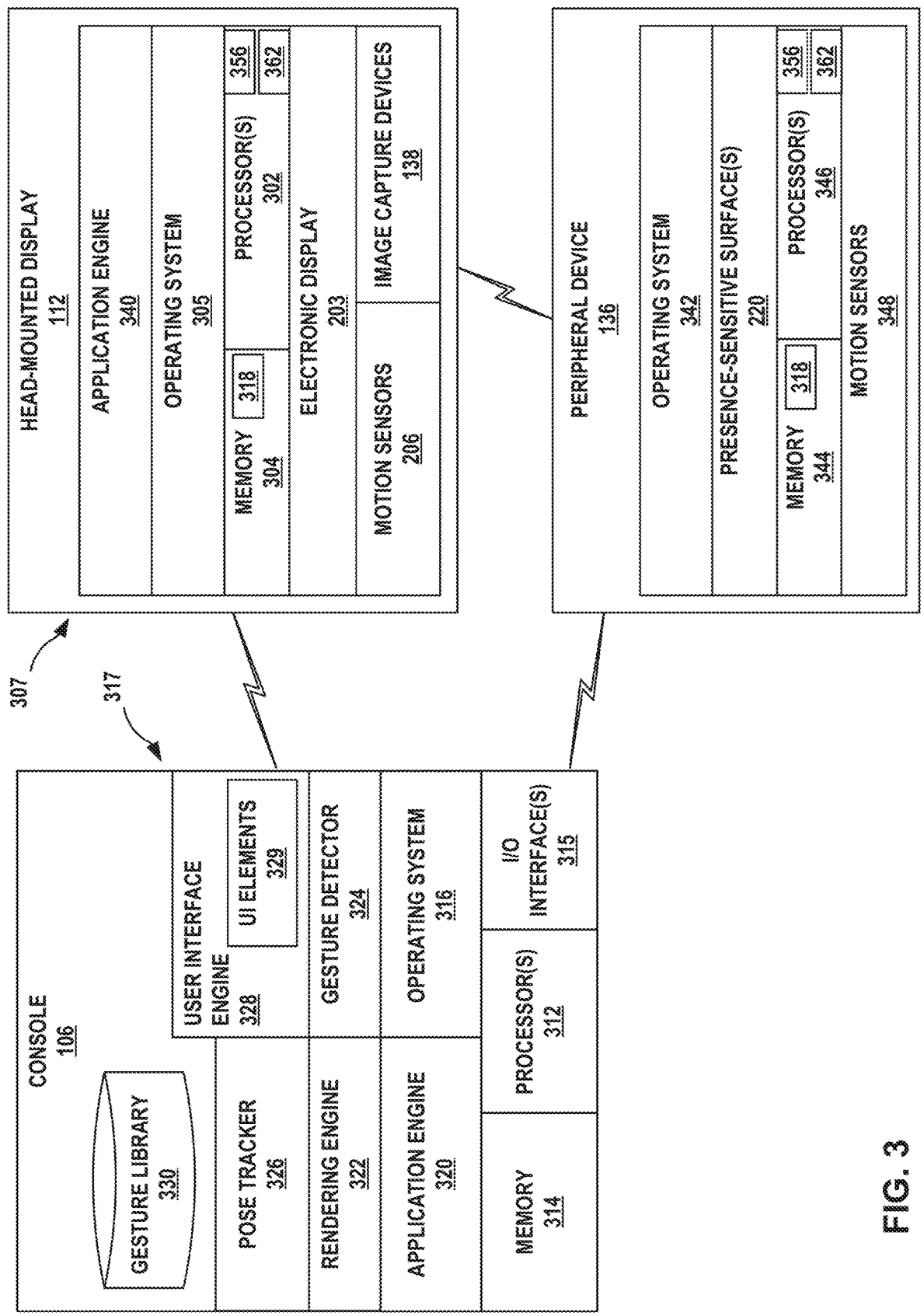
FIG. 3 is a block diagram showing example implementations of a console, an HMD, and a peripheral device of the multi-device artificial reality systems of FIGS. 1A, 1B, in accordance with techniques described in this disclosure.

FIG. 3 is a block diagram showing example implementations of console 106, HMD 112, and peripheral device 136 of multi-device artificial reality system 10, 20 of FIGS. 1A, 1B, in accordance with techniques described in this disclosure. In the example of FIG. 3, console 106 performs pose tracking, gesture detection, and user interface and virtual surface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or image capture devices 138 HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software components 317 of console 106 operate to provide an overall artificial reality application. In this example, software components 317 include application engine 320, rendering engine 322, gesture detector 324, pose tracker 326, and user interface engine.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for peripheral device 136 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render, based on a current pose for peripheral device 136, the virtual user interface at a user interface position, in the artificial reality environment, that is locked relative to a position of peripheral device 136 in the artificial reality environment. The user interface position may be a position of one of presence-sensitive surfaces 220, and rendering engine 322 may scale, rotate, and otherwise transform the virtual user interface to apply projection to match the pose, size, and perspective of the presence-sensitive surface 220 such that the virtual user interface appears, in the artificial reality environment, to be overlaid on the presence-sensitive surface 220. User interface engine 328 may generate virtual user interface to be partially transparent, allowing presence-sensitive surface 220 to be seen by the user. This degree of transparency may be configurable.

Console 106 may output this virtual user interface and other artificial reality content, via a communication channel, to HMD 112 for display at HMD 112. Rendering engine 322 receives pose information for peripheral device 136 to continually update the user interface position and pose to match that of the peripheral device 136, such as that of one of presence-sensitive surfaces 220.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 may process the user inputs to detect one or more gestures of gesture library 330.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Some entries in gesture library 330 may each define a gesture as one or more user inputs, over time, detected by presence-sensitive surface(s) 220 of peripheral device 136. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software components 317. For example, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The user interface engine 328 can define the menu that is displayed and can control actions that are performed in response to selections caused by selection gestures.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In accordance with the techniques described herein, the multi-device artificial reality system of FIG. 3 facilitates secure booting of artificial reality applications. For example, as discussed with respect to the examples of FIGS. 2A and 2B, processors 346 of peripheral device 136 may include boot processor 356 to provide security (e.g., in a boot security wrapper) for boot sequences executed by application processor 362. Similarly, processors 302 of HMD 112 may include boot processor 356 to provide secure booting of application processor 362.

In accordance with the techniques of this disclosure, a boot processor 356 of peripheral device 136 may manage a boot sequence of an application processor 362 of peripheral device 136 to improve boot sequence security for the application processor. For example, the boot processor 356 may control the boot sequence by moving firmware 318 from a first storage device to a second storage device, verifying firmware 318 in the second storage device, and providing, upon request, firmware 318 to application processor 362 while representing itself as the first storage device that stores firmware for the application processor 362. In some examples, the first storage device includes non-volatile memory and resides in a position external to a SoC having boot processor 356 and the second storage device is an embedded storage device in that SoC. The second storage device may be more secure from misappropriation than the first storage device. For example, if the second storage device includes an embedded controller, a malicious entity would have to exploit both application processor 362 and the SoC having boot processor 356. Boot processor 356 is able to represent itself to the application processor 362 as the first storage device because the SoC resides on data lines between the application processor 362 and the first storage device.

The boot processor 356 may independently validate the firmware as being an authorized version. The boot processor 356 may also validate traces between itself and the application processor 362 or between itself and the non-volatile portions of memory 344. In response to validating the firmware, traces, or other properties of the system, the boot processor 356 boots the application processor 362, which requests the firmware from the boot processor 356. The boot processor 356 reads the firmware from the non-volatile portions of memory 344 and provides the firmware to the application processor 362 for loading according to the boot sequence. The techniques described above with respect to boot processor 356 and an application processor 362 of peripheral device 136 may also be implemented in a boot processor and application processor of HMD 112.

Figure 4:
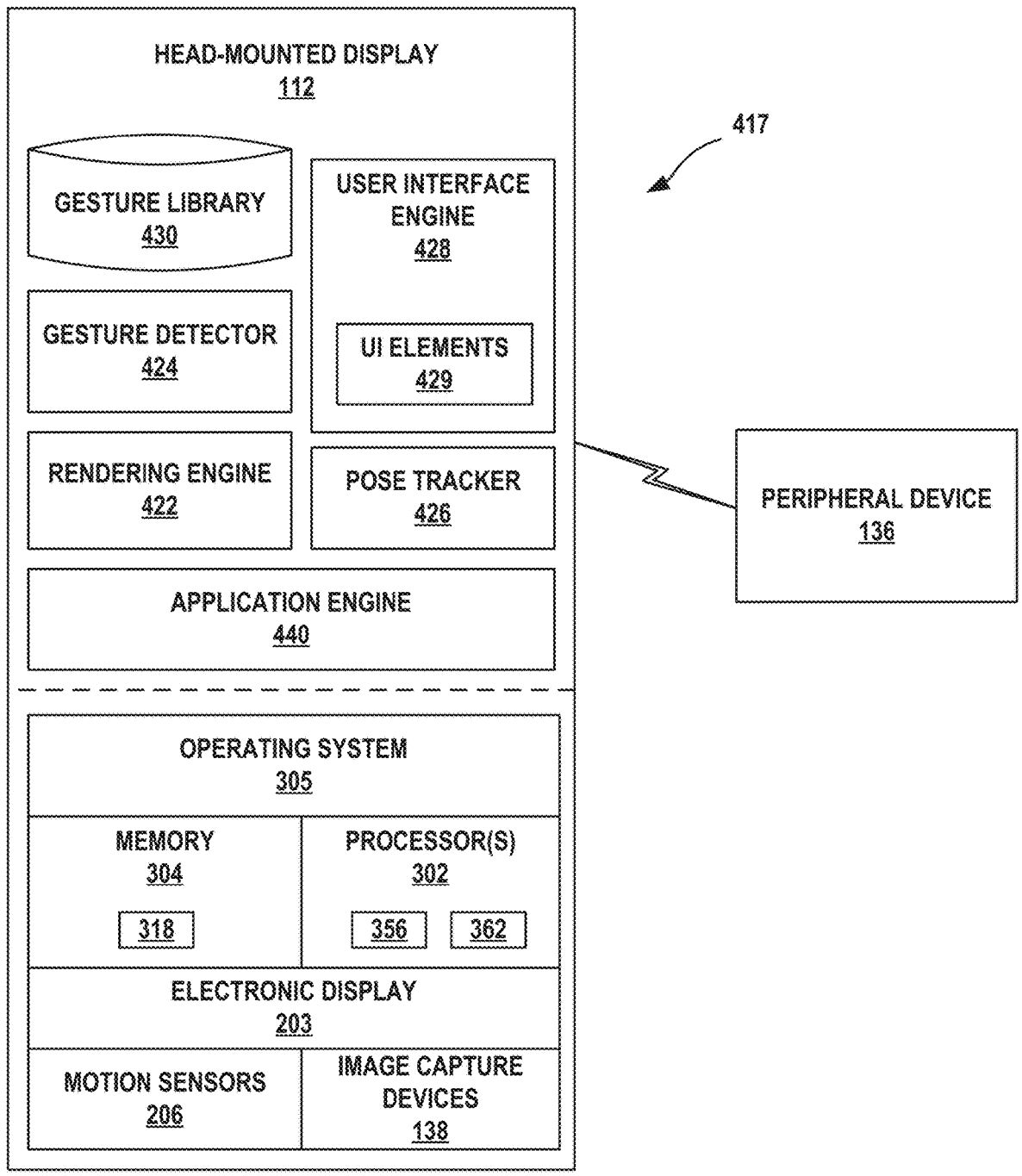
FIG. 4 is a block diagram depicting an example in which gesture detection, user interface generation, and virtual surface functions are performed by the HMD of the artificial reality systems of FIGS. 1A, 1B, in accordance with the techniques described in this disclosure.

FIG. 4 is a block diagram depicting an example in which gesture detection and virtual surface generation is performed by HMD 112 of the artificial reality systems of FIGS. 1A, 1B in accordance with the techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110.

More specifically, gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. A virtual surface application generates virtual surfaces as part of, e.g., overlaid upon, the artificial reality content to be displayed to user 110 and/or performs actions based on one or more gestures or combinations of gestures of user 110 detected by gesture detector 424. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136. Gesture library 430 is similar to gesture library 330 of FIG. 3. Some of all of the functionality of gesture detector 424 may be executed by peripheral device 136.

Components of peripheral device 136 in FIG. 4 may operate similarly to components of peripheral device 136 in FIG. 3. The techniques described with respect to FIG. 3 and peripheral device 136 may also be implemented in boot processor 356 and application processor 362 of processors 302 of HMD 112. Hence, when some activity initiates a boot sequence for application processor 362 of processors 302 of HMD 112, boot processor 356 of processors 302 of HMD 112 obtains firmware 318 from a first storage device via a first storage protocol and stores firmware 318 in a second storage device via a second storage protocol. The second storage device may be a memory device that includes flash memory and is internal to boot processor 356. The first storage device may include non-volatile memory and reside in a position that is external to a SoC having boot processor 356 and the second storage device. In some examples, the second storage device may be embedded into the SoC having boot processor 356, such as an Embedded Multi-Media-Controller (eMMC) device having a managed NAND memory architecture, while the first storage device is not embedded in the SOC and is configured with a different memory architecture.

Figure 5A:
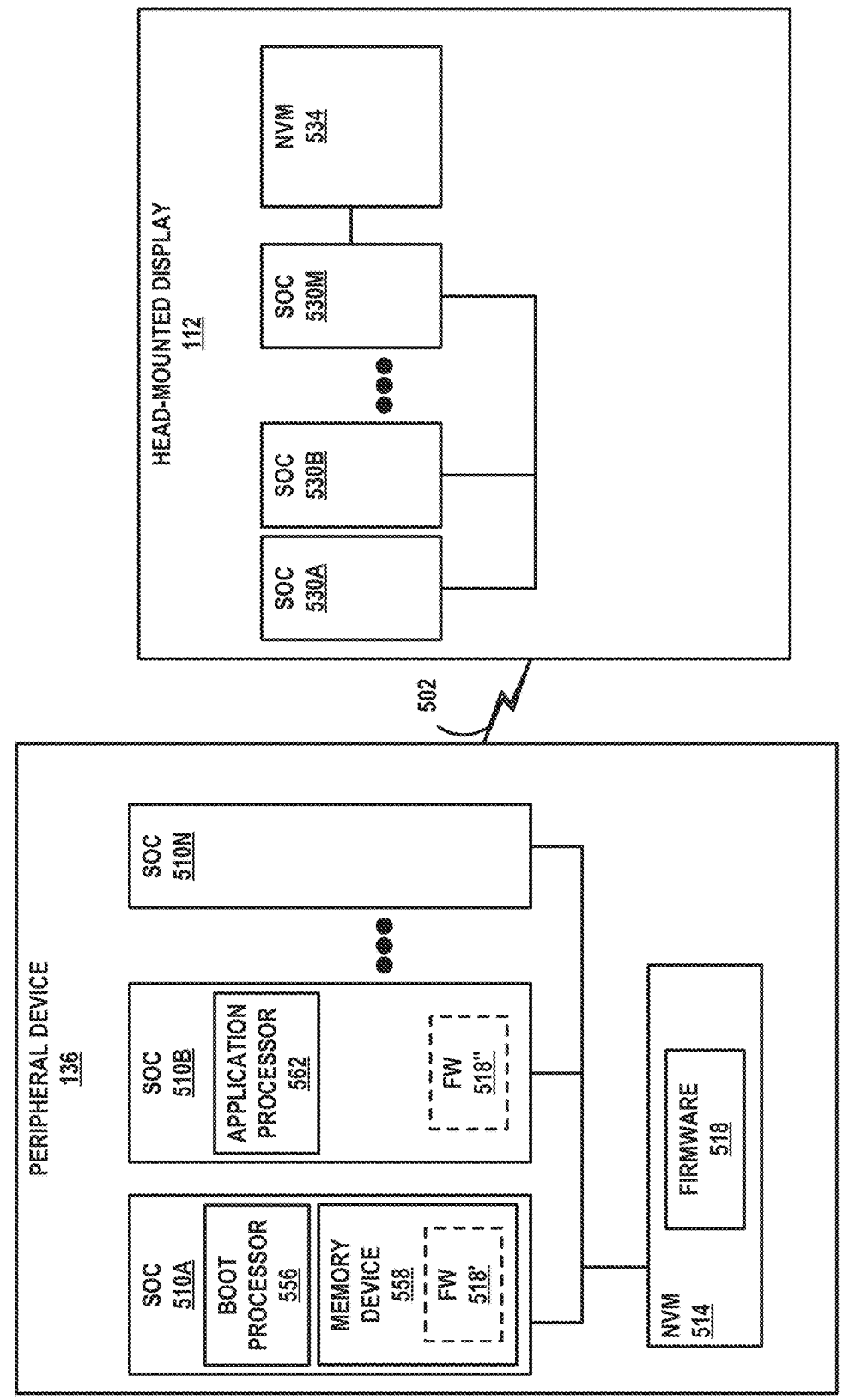
FIG. 5A is a block diagram showing an example implementation of distributed architecture for a multi-device artificial reality system, in accordance with the techniques described in this disclosure.

FIG. 5A is a block diagram showing an example implementation of a distributed architecture for a multi-device artificial reality system 500. In this example, one or more devices (e.g., HMD 112 and peripheral device 136) are implemented using one or more System-on-a-Chip (SoC) integrated circuits, in accordance with the techniques described in this disclosure. HMD 112 and peripheral device 136 exchange data through wired and/or wireless communications via a communication link 502. HMD 112 may be an example of any of HMDs 112 of FIGS. 1A-4. HMD 112 may be part of an artificial reality system, such as artificial reality systems 10, 20 of FIG. 1A, 1B, or may operate as a stand-alone, mobile artificial reality system configured to implement the techniques described herein.

Figure 5B:
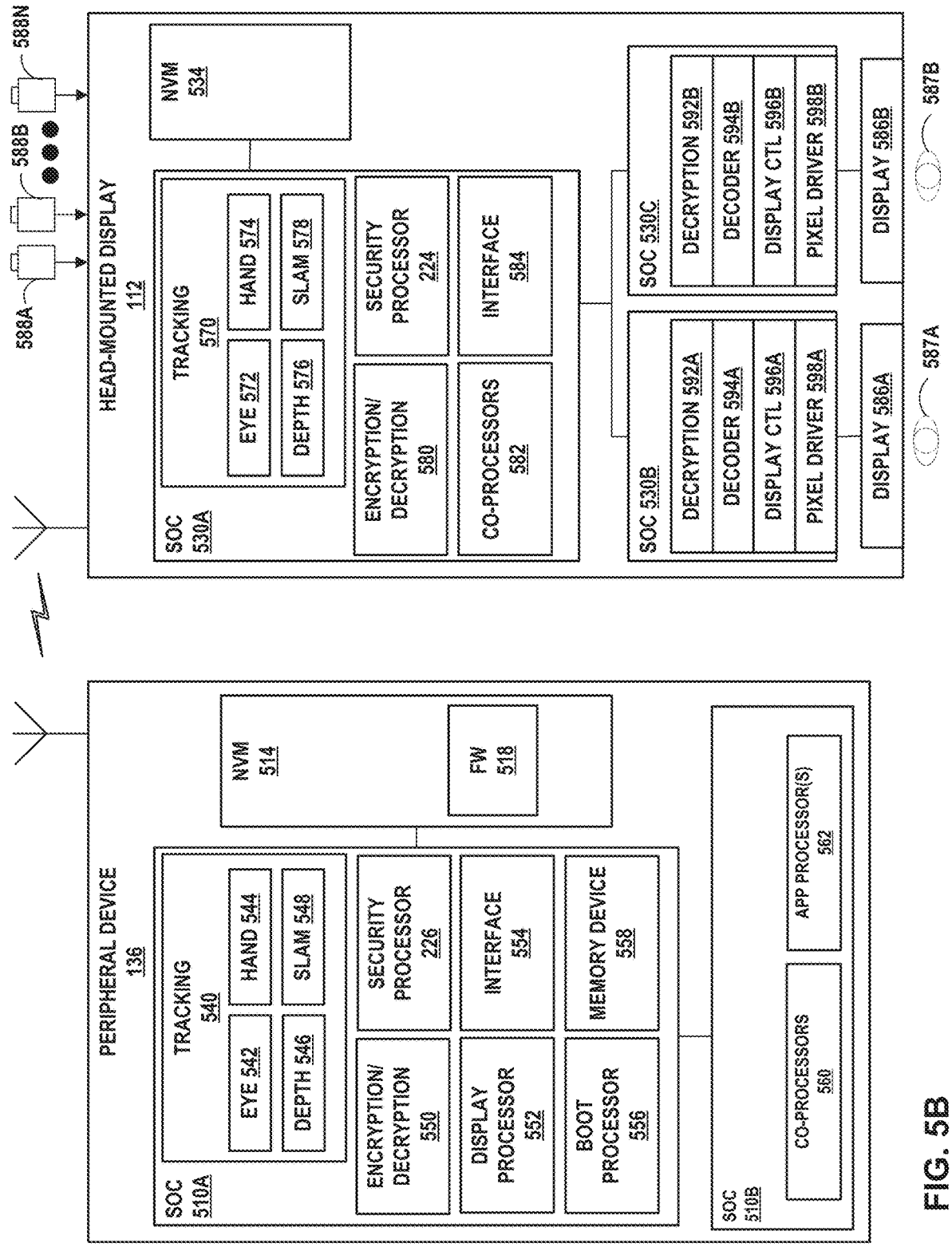
FIG. 5B is a block diagram illustrating a more detailed example implementation of a distributed architecture for a multi-device artificial reality system in which one or more devices (e.g., peripheral device and HMD) are implemented using one or more SoC integrated circuits within each device, in accordance with the techniques described in this disclosure.

In this example, HMD 112 includes SoCs 530A-530M (collectively, "HMD SoCs 530"), and non-volatile memory 534. In general, SoCs 530 represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components. A more detailed example is shown in FIG. 5B.

Peripheral device 136 includes SoCs 510A-510N (collectively, "peripheral device SoCs 510"), and non-volatile memory 514. SoCs 510 may each be configured to support an artificial reality application, such as SoCs operating as co-application processors, sensor aggregators, display controllers, etc.

As described herein, one or more SoCs 510 may operate as co-processors for artificial reality applications that perform various functions on the AR system. In some examples, one or more SoCs 510 boot artificial reality applications by first loading their respective firmware code packages into memory (e.g., an embedded memory device having flash memory or another non-volatile memory) and then, running those firmware code packages from memory. For example, SoC 510A operating as a co-processor for an artificial reality application loads firmware 518 from memory device 514 into memory 558 and then runs firmware 518 from a corresponding application processor 562 or any other processing unit (i.e., CPU). Before SoC 510B may load firmware 518 into memory, a control SoC (e.g., SoC 510A) prevents the boot sequence of SoC 510B from being exploited, for example, into running arbitrary and/or fraudulent code on peripheral device 136. While described herein as a "control" SoC, an SoC that applies techniques described above and elsewhere herein may execute instructions for applications, such as artificial reality applications.

The control SoC (e.g., SoC 510A) is configured to protect the boot sequence of firmware 518 from exploitation by moving firmware 518 to an embedded memory device and by executing one or more verification routines on firmware 518, and once verified, the control SoC provides firmware 518 to application processor 562 in SoC 510B. The embedded memory device may be more secure than the NVM, which is an external storage device. A malicious entity would need to either (1) exploit both the control SoC and the application processor 562 to be successful. By residing in a data path between SoC 510B and NVM 514, the control SoC is able to operate as NVM 514 to SoC 510B. When application processor 562 requests firmware 518 from NVM 514 to continue the boot sequence, the control SoC responds by communicating firmware 518 from the embedded memory device. Hence, the control SoC (e.g., SoC 510A) uses the embedded memory device to store the firmware 518 for verification while in transit from the NVM 514 to the SoC 510B. The embedded memory device and the NVM 514 may be configured with same/similar architectures or different architectures. Alternatively, instructions for loading the firmware 518 from the NVM 514 can be adapted and/or applied for loading the firmware 518' from the embedded memory device such that the boot sequence remains more or less unchanged. Furthermore, the attacker cannot manipulate any operations within the control SoC (e.g., SoC 510A) without physically opening peripheral device 136 and accessing the control SoC (e.g., SoC 510A) and the embedded memory device.

FIG. 5B is a block diagram illustrating a more detailed example implementation of a distributed architecture for a multi-device artificial reality system in which one or more devices (e.g., peripheral device 136 and HMD 112) are implemented using one or more SoC integrated circuits within each device.

In general, the SoCs illustrated in FIG. 5B represent a collection of specialized integrated circuits arranged in a distributed architecture, where each SoC integrated circuit includes various specialized functional blocks configured to provide an operating environment for artificial reality applications. FIG. 5B is merely one example arrangement of SoC integrated circuits. The distributed architecture for a multi-device artificial reality system may include any collection and/or arrangement of SoC integrated circuits.

In the example of FIG. 5A, security processor 224 of HMD 112 provides secure device attestation and mutual authentication for HMD when pairing with other devices, e.g., peripheral device 136, that are used in conjunction within the AR environment. When HMD 112 is powered on and performs a secure boot via boot processor 556, security processor 224 may authenticate one or more SoCs 530 of HMD 112. When peripheral device 136 is powered on and performs a secure boot via boot processor 556, a security processor 226 may authenticate one or more SoCs 510 of peripheral device 136 as application processor 562 loads firmware 518.

In this example, SoC 530A of HMD 112 comprises functional blocks including security processor 224, tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 is a functional block to encrypt outgoing data communicated to peripheral device 136 or security server and decrypt incoming data communicated from peripheral device 136 or security server. Encryption/decryption 580 may support symmetric key cryptography to encrypt/decrypt data with a session key (e.g., secret symmetric key). For example, when sending the device certificates to the security server via peripheral device 136 for attestation, encryption/decryption 580 encrypts device certificates of SoCs 530A-530C with a first session key (Ski) for securely communicating the device certificates to peripheral device 136. Encryption/decryption 580 also encrypts the device certificates with a public key to securely communicate the device certificates to the security server. In response to receiving a pairing certificate encrypted with the second session key ($S_{k2}$) from peripheral device 136, encryption/decryption 580 decrypts the encrypted pairing certificate using the second session key ($S_{k2}$). In some examples, the security server may digitally sign the pairing certificate by encrypting a hash of the pairing certificate with a private key. In these examples, encryption/decryption 580 verifies the signature using a server public key and verifies the authenticity and integrity of the pairing certificate (e.g., by running the pairing certificate through the same hashing algorithm as the security server).

Co-application processors 582 includes one or more processors for executing instructions, such as a video processing unit, graphics processing unit, digital signal processors, encoders and/or decoders, and/or others.

Interface 584 is a functional block that includes one or more interfaces for connecting to functional blocks of SoC 530A. As one example, interface 584 may include peripheral component interconnect express (PCIe) slots. SoC 530A may connect with SoC 530B, 530C using interface 584. SoC 530A may connect with a communication device (e.g., radio transmitter) using interface 584 for communicating with other devices, e.g., peripheral device 136.

SoCs 530B and 530C each represents display controllers for outputting artificial reality content on respective displays, e.g., displays 586A, 586B (collectively, "displays 586"). In this example, SoC 530B may include a display controller for display 568A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 568B to output artificial reality content for a right eye 587B of the user. For example, SoC 530C includes decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 136 includes SoCs 510A and 510B configured to support an artificial reality application. In this example, SoC 510A comprises functional blocks including security processor 226, tracking 540, an encryption/decryption 550, a display processor 552, and an interface 554. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 136 may receive input from one or more accelerometers (also referred to as inertial measurement units or "IMUs") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 136 and, in accordance with the current pose, renders the artificial reality content to HMD 112.

Encryption/decryption 550 encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key).

Display processor 552 includes one or more processors such as a video processing unit, graphics processing unit, encoders and/or decoders, and/or others, for rendering artificial reality content to HMD 112.

Interface 554 includes one or more interfaces for connecting to functional blocks of SoC 510A. As one example, interface 584 may include peripheral component interconnect express (PCIe) slots. SoC 510A may connect with SoC 510B using interface 584. SoC 510A may connect with one or more communication devices (e.g., radio transmitter) using interface 584 for communicating with other devices, e.g., HMD 112.

As discussed with respect to the example of FIG. 5A, security processor 226 provides secure device attestation and mutual authentication of peripheral device 136 when pairing with devices, e.g., HMD 112, used in conjunction within the AR environment. When peripheral device 136 is powered on and performs a secure boot, security processor 226 may authenticate SoCs 510A, 510B of peripheral device 136 based on the pairing certificate stored in NVM 514. If a pairing certificate does not exist or the devices to be paired have changed, security processor 226 may send to the security server device certificates of SoCs 510A, 510B for attestation.

SoC 510B includes co-application processors 560 and application processors 562. In this example, co-application processors 560 includes various processors, such as a vision processing unit (VPU), a graphics processing unit (GPU), and/or central processing unit (CPU). Application processors 562 may execute one or more artificial reality applications to, for instance, generate and render artificial reality content and/or to detect and interpret gestures performed by a user with respect to peripheral device 136.

In some examples, SoC 510A includes various technology to improve boot sequence security, in accordance with the present disclosure and, in particular, to manage a boot sequence of application processor 562. In one example, SoC 510A controls a boot sequence of application processor 562 by operating between application processor 562 and a storage device that stores firmware 518 for application processor 562 as well as independently validating the firmware 518 for execution. To perform such validation, SoC 510A moves firmware 518 to an embedded flash memory device from the above-mentioned storage device, which is depicted in FIG. 5A as NVM 514. As described herein, the embedded flash memory device is more secure than NVM 514 and enables execution of verification routines to effectuate the independent validation of firmware 518.

The above-mentioned embedded flash memory device may be memory device 558—an embedded storage device that is internal to SoC 510A. When some activity (e.g., an installation process in the boot sequence) stores firmware 518 for the artificial reality application on the NVM 514 in the peripheral device 136, SoC 510A copies firmware 518 to flash memory 550 where SoC 510A performs one or more verification routines to determine whether to proceed with the boot sequence. During an example verification routine, SoC 510A may independently validate firmware 518 as being an authorized version. SoC 510A may also independently verify that firmware 518 has not been tampered with or adulterated. Once validated, SoC 510A boots application processor 562, which requests firmware 518 from NVM 514. SoC 510A, in response to that request, reads firmware 518 from memory device 558 and communicates firmware 518 to application processor 562. SoC 510A boots application processor 562, e.g., by sending one or more signals, powering up application processor 562, or by sending application 562 instructions to initiate or proceed with the boot sequence. In operation as a control SoC, SoC 510A may also validate physical traces in the circuit board to and from application processor 562 and/or traces to and from the storage device.

In one example, after storing firmware 518' in memory device 558, boot processor 556 performs a number of verification routines to ensure that firmware 518' has not been compromised or otherwise corrupted. While there exists a number of known verification routines, those of ordinary skill having the benefit of the present disclosure may create custom appropriate verification routines when needed. At least some of these verification routines are configured to validate a version of firmware 518'. Once firmware 518' is validated, boot processor 556 communicates data to application processor 562 indicating that firmware 518' is safe to run. As described herein, the application processor 562 in SoC 510B completes the boot sequence by receiving firmware 518' from memory device 558 (which is an internal flash memory device, such as an embedded MultiMediaCard (eMMC) device or a Universal Flash Service (UFS) device). One purpose of memory device 558 is to imitate NVM 514 while boot processor 556 of SoC 510A controls the boot sequence. Application processor 562 stores the received firmware 518' as firmware 518" in memory device 558.

Figure 5C:
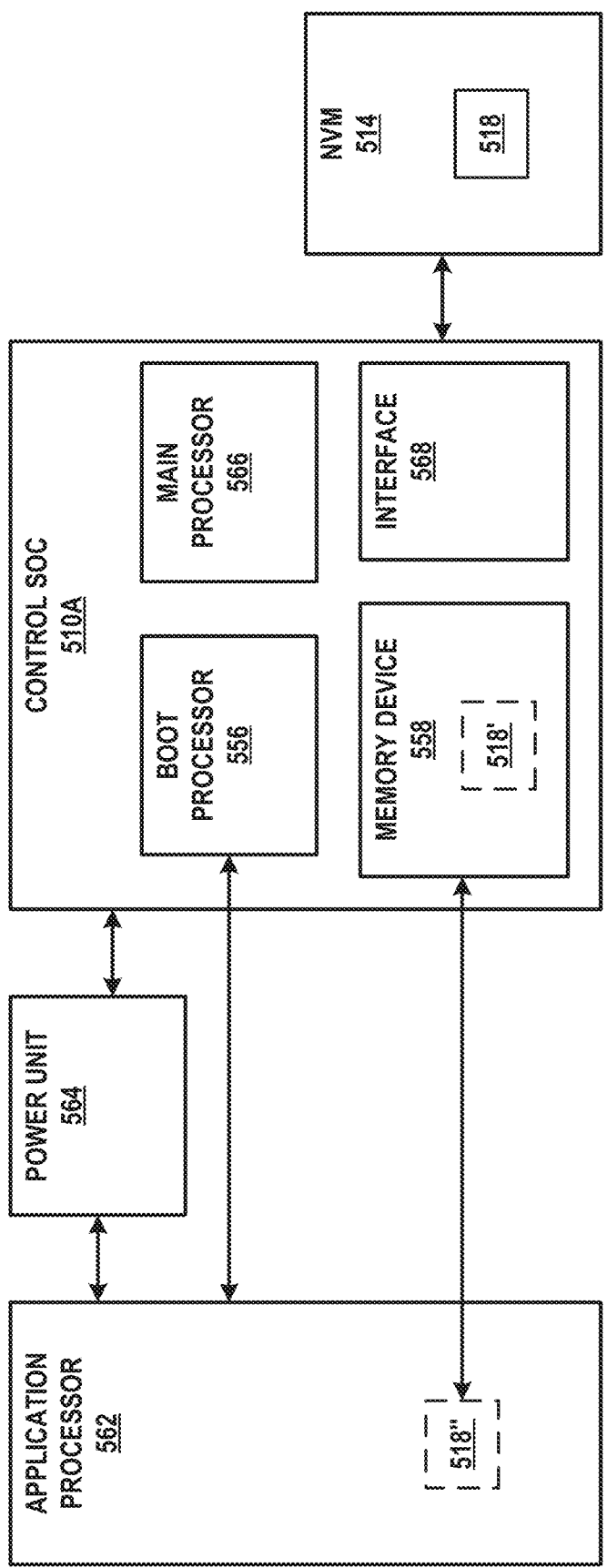
FIG. 5C is a block diagram showing example components of a multi-device artificial reality system that implement a boot security wrapper, according to techniques described in this disclosure.

FIG. 5C is a block diagram showing example components of a multi-device artificial reality system 500 that implements a boot security wrapper, according to techniques described in this disclosure. As shown in FIG. 5C, SoC 510A operates as the boot security wrapper for an artificial reality application by securing data (e.g., firmware) communicated between application processor 562 and at least one storage device including storage device 568.

Power Unit 564 controls electrical power for control SoC 510A and application processor 562. Activation of power unit 564 may trigger a boot sequence for boot processor 556, which, after obtaining and validating firmware 518 from NVM 514, prompts the application processor 562 to request and execute the firmware.

Control SoC 510A includes boot processor 556, memory device 558, main processor 566, and interface 568. In some examples, memory device 558 includes raw NAND flash or managed NAND flash memory such as an eMMC device. Memory device 558 in effect imitates another storage device such as NVM 514. In some cases, memory device 558 implements a same or similar addressing scheme to store the firmware as NVM 514. Interface 568 is configured to manage input/output into the NVM 514 including the communication of image files comprising firmware 518. In some example, interface 568 includes a serial interface for NOR flash memory. Each of boot processor 556, main processor 566, and application processor 562 has an associated storage device to store firmware instructions for the processor. Each of boot processor 556, main processor 566, and application processor 562 may also have an associated main memory device to store application, operating system, or other instructions.

Boot processor 556 executes one or more verification routines on the firmware 518 to validate firmware code's integrity and authenticity. An example verification routine identifies changes to any legitimate firmware code and/or injections of arbitrary code. By introducing the secure storage of firmware 518 and the verification routines for firmware 518, boot processor 556 protects potential vulnerabilities in firmware 518 from being exploited. Boot processor 556 communicates, to application processor 562 from memory device 558, firmware 518 including instructions for booting application processor 562. These communications include data traces of firmware 518 as well as transmission of firmware 518 to application processor 562.

To take advantage of an exploit in the application processor 562 boot sequence, a malicious entity would need to either (1) exploit both SoC 510A and application processor 562, which is more difficult that exploiting application processor 562 alone, or (2) modify a circuit board in a non-trivial way in order to avoid the SoC 510A. The techniques may be applied in combination with (e.g., prior to) other verification processes for securing the boot sequence for application processor 562.

Figure 6:
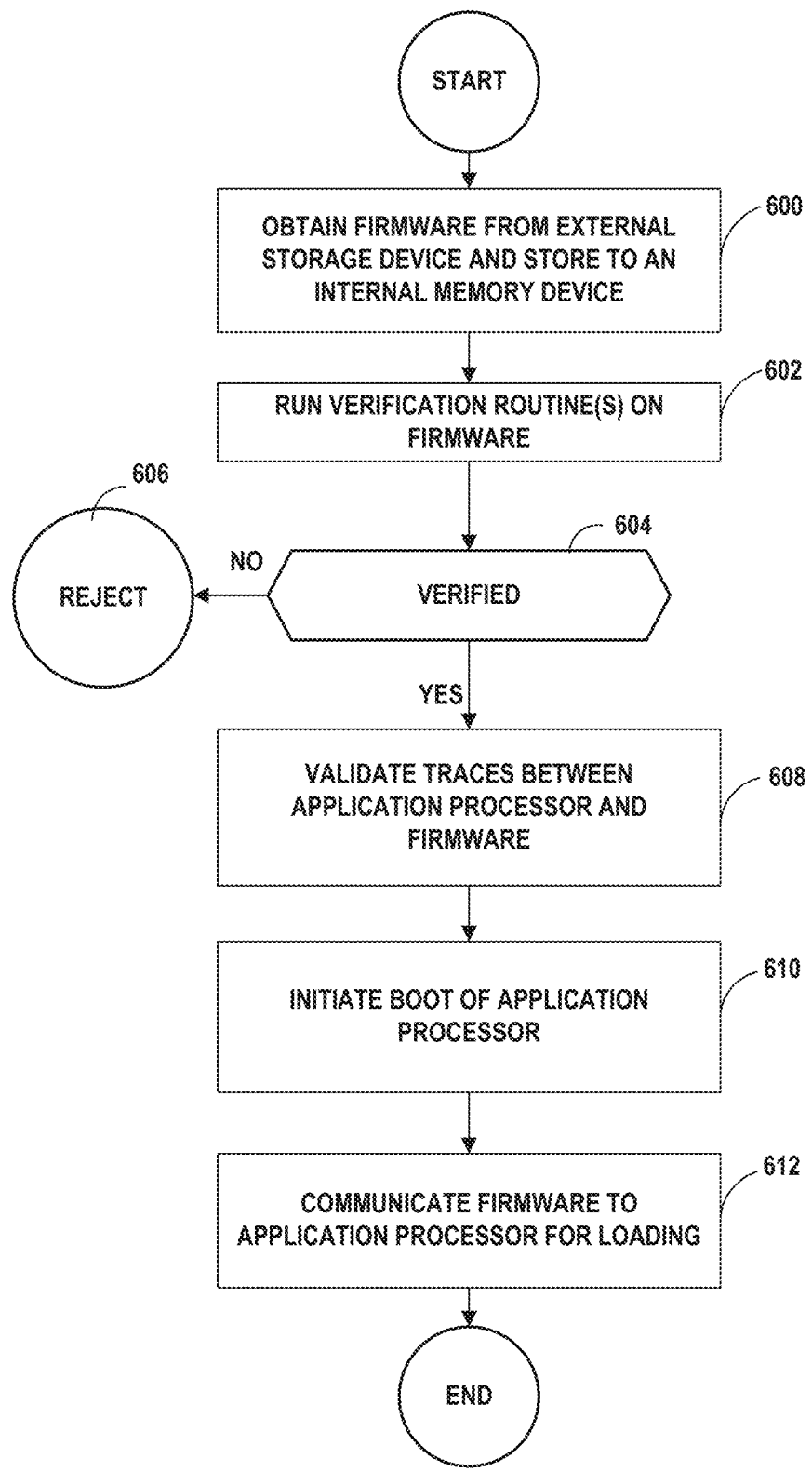
FIG. 6 is a flow diagram illustrating an example operation of boot security, in accordance with one or more techniques of this disclosure.

FIG. 6 is a flow diagram illustrating an example operation for securing a boot sequence for an artificial reality application, in accordance with one or more techniques of this disclosure. FIG. 6 is described with respect to artificial reality system 500 of FIGS. 5A-5C. However, the techniques of FIG. 6 may be performed by different components of artificial reality system 500 or by additional or alternative devices.

As described herein, peripheral device 136 of artificial reality system 500 may include one or more System on a Chip (SoC) integrated circuits configured to support an artificial reality application, such as SoCs operating as co-application processors, sensor aggregators, display controllers, etc. When peripheral device 136 is powered on, peripheral device 136 may commence a boot sequence for one or more artificial reality applications. A Control SoC such as SoC 510A of peripheral device 136 secures the boot sequence by operating as a boot security wrapper.

When a process (e.g., an installation process, a recovery process, a startup process, and/or the like) stores firmware for an artificial reality application in a storage device, a processor (e.g., boot processor 556) in the Control SoC or another SoC (e.g., SoC 510B) obtains the firmware from an external storage device and stores the firmware in flash memory in an internal memory device (600). The external storage device is external to the Control SoC and the internal memory device is internal to the Control SoC. In some examples, the internal memory device is embedded into the Control SoC. When compared to the external storage device such as NVM 514, the internal memory device is sufficiently different in architecture for an exploit to no longer be effective. For instance, whereas the external storage device may include a removable storage card or other storage device that is readily accessible, removable, swappable, writeable or otherwise modifiable, the internal memory device may be located within an SoC package and not accessible without damaging the SoC package. In one example, the Control SoC obtains the firmware from the external storage device using a first storage protocol while application processor 562 uses second storage protocol for at least reading data from the internal memory device. FIGS. 5A-5C illustrate various embodiments of at least a portion of the example operation described in FIG. 6; in one example embodiment, SoC 510A moves firmware 518 to memory device 558 from NVM 514 as directed by boot processor 556 of SoC 510A. In addition, SoC 510A exercises control over embedded flash memory in the internal memory device.

A processor of the Control SoC, such as boot processor 556 of SoC 510A, runs a number of verification routines on the firmware in the flash memory in an internal flash memory device (602). In some instances, the above-mentioned processor of the Control SoC runs a verification routine that rejects the firmware if that firmware has indicia of exploitation (604). The verification routine may be configured to identify arbitrary code in an image of the firmware. In other instances, the above-mentioned processor of the Control SoC runs a verification routine that validates the firmware's integrity. If the verification routine determines that the firmware is invalid, the Control SoC rejects the firmware and halts the boot sequence (606). On the other hand, once the firmware is validated, the Control SoC processes data initiating a boot sequence between an application processor of another SoC (e.g., SoC 510B) and the firmware.

In response to the firmware validation via the verification routines, the above-mentioned processor of the Control SoC validates traces between the application processor and firmware in the Control SoC (608). The above-mentioned processor of the Control SoC initiates a boot of the application processor (610) and in response to the application processor's request, communicates the firmware to the application processor of the other SoC (612). In one example, the Control SoC communicates the firmware to the application processor using a second storage protocol that is different from the first storage protocol. At this point, it is safe for the application processor to run the firmware and start application operations.

Figure 7:
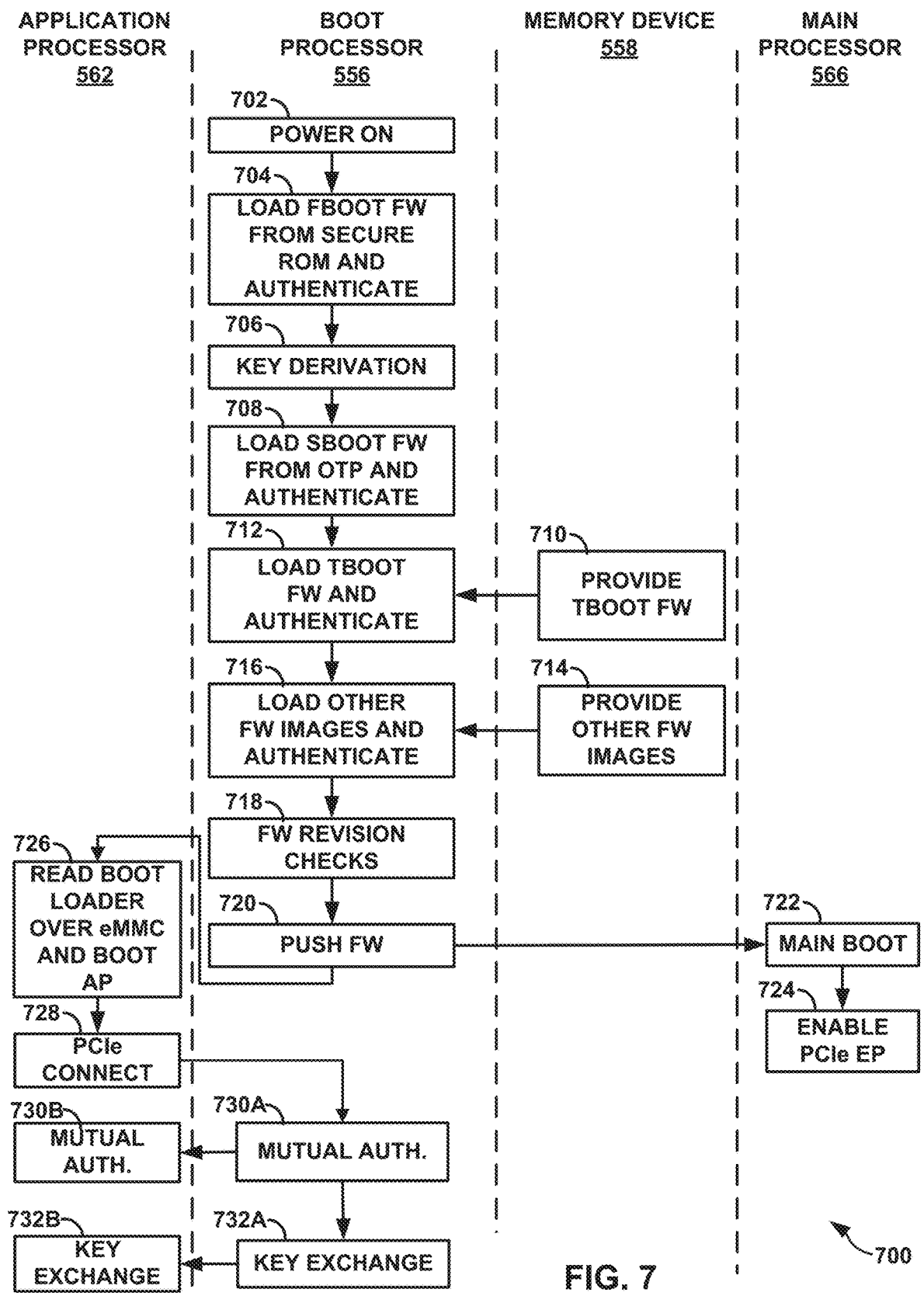
FIG. 7 is a timing diagram illustrating a sequence of operations performed by components of an artificial reality system of FIGS. 5A-5C in accordance with one or more techniques of this disclosure.

FIG. 7 is a timing diagram illustrating a sequence of operations performed by components of an example artificial reality system, in accordance with one or more techniques of this disclosure. The illustrated sequence of operations in FIG. 7 can be divided into amongst at least four components of artificial reality system 500. FIG. 7 depicts interactions between application processor 562, boot processor 556, memory device 558, and main processor 556 of FIG. 5C in securing a boot sequence. Boot processor 556 may be known as root of trust processor. In general, boot processor 556 operates in between a second processor and a storage device that is external to the boot processor 556 (e.g., external to a SoC comprising the boot processor 556). Boot processor 556, memory device 558, and main processor 556 may be components of a SoC package that does not include application processor 562, which may be a component of another SoC package or be independently on a circuit board.

An activity such as powering on peripheral device 136 starts the above-mentioned sequence of operations and prompts boot processor 556 to validate firmware provided for initiating main processor 556 and/or operating application processor 562 (702). Boot processor 556 prepares a number of firmware image files for execution. These image files are labelled fboot, sboot, and tboot. Before executing fboot, sboot, and tboot image files, boot processor 556 validates each image file of firmware code. In one example, the boot processor 556 obtains at least some firmware image files (e.g., firmware 518) from the external storage device (e.g., non-volatile memory 514) using a first storage protocol and the boot processor 556 stores the at least some firmware image files into a second storage device (e.g., an embedded storage device, a secure storage device, an embedded secure storage device, and/or the like).

During each firmware image file authentication, boot processor 556 may runs one or more of verification routines to authenticate and/or validate the firmware. As depicted in FIG. 7, boot processor 556 loads the fboot image file(s) from a secure read-only-memory (ROM), authenticates the fboot image file(s) (704) and then performs key derivation (706). As further depicted in FIG. 7, boot processor 556 loads the sboot image file(s) from one-time programmable memory (OTP) and then authenticates the sboot image file(s) (708). Memory device 558 provides tboot firmware image file(s) (710), and boot processor 556 loads and authenticates the tboot firmware image file(s) (712). Memory device 558 subsequently provides other firmware image file(s) (714), and boot processor 556 loads and authenticates the other firmware image file(s) (716). Boot processor 556 concludes with firmware revision checks (718) and with pushing the authenticated firmware image files to main processor 566 for execution (720). By pushing the authenticated firmware image files or by signaling main processor 566, boot processor 556 boots main processor 566 for at least one device in the artificial realty system (722). In one example, boot processor 556 boots using secure firmware stored to a secure storage device of a System-on-Chip (SoC) that includes boot processor 556 and/or main processor 566. Main processor 566 executes the firmware from the images files and proceeds to run various applications and connected devices in artificial realty system 500. As one operation, main processor 566 enables a PCIe EP interface (724).

Boot processor 556 communicates, to application processor 562 from the second storage device (e.g., memory device 558), firmware for loading and execution. Boot processor 556 may communicate the firmware to the application processor 562 using a second storage protocol where the first storage protocol is different than the second storage protocol. This because the external storage device requires a different storage protocol than the second storage device mentioned herein. Boot processor 556 may initiate execution of application processor 562. As depicted in FIG. 7, once initiated, application processor 562 reads firmware, in the form of a boot loader in this example operation, from an eMMC (embedded Multi-Media Controller) device such as memory device 558 accessible via control SoC 510A (726). The boot loader may have been one of the firmware image files validated by boot processor 556. Having the boot loader, application processor 562 continues through the boot process, which in this example includes a PCIe connect (728) with boot processor 556. In turn, boot processor 556 and application processor 562 undergo mutual authentication (730A-730B) and key exchange (732A-732B) to facilitate secure communication between these components.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. A method comprising:
   storing, within a memory of a boot processor, a firmware image retrieved from a storage device external to the boot processor, the firmware image including firmware required to boot another processor;
   running, by the boot processor, a verification routine on the firmware image stored within the memory of the boot processor to validate the firmware in the firmware image;
   executing a storage protocol at the boot processor to emulate, to the application processor, a storage device;
   receiving at the boot processor, from an application processor, a request in the storage protocol for firmware needed to boot the application processor; and
   transferring, using the storage protocol, the firmware requested to the application processor for use in booting the application processor.

2. The method of claim 1,
   wherein the boot processor and the memory of the boot processor are components of a first System-on-Chip (SoC), and
   wherein the storage device is external to the first SoC.

3. The method of claim 2, wherein the application processor is a component of a second SoC.

4. The method of claim 1, further comprising:
   in response to validating the firmware with the verification routine, initiating, by the boot processor, a boot sequence of the application processor.

5. The method of claim 1,
   wherein the storage protocol executed to emulate a storage device is different from a storage protocol used to retrieve the firmware image from the external storage device.

6. The method of claim 1, wherein the boot processor boots using secure firmware stored to a secure storage device of a first System-on-Chip that includes the boot processor.

7. The method of claim 1,
   storing, by the boot processor, the firmware to an embedded storage device of a first System-on-Chip that includes the boot processor,
   wherein the embedded storage device comprises non-volatile memory.

8. The method of claim 1, wherein transferring the firmware requested to the application processor comprises verifying traces between the first boot processor and the application processor have not been physically compromised before transferring the firmware requested to the application processor.

9. The method of claim 1, the method further comprising:
   generating, by the application processor, artificial reality content for display at a head-mounted display.

10. A computing device comprising:
    a first processor coupled to a first storage device, the first processor and first storage device configured to:
       store, within the first storage device, firmware retrieved from a storage device external to the first processor, the firmware image including firmware required to boot another processor;
       run, within the first processor, a verification routine on the retrieved firmware to validate the firmware;
       execute at the first processor a storage protocol to emulate, to a second processor, the external storage device;
       receive, at the first processor, a request from the second processor for firmware needed to boot the second processor; and
       transfer the firmware requested to the second processor using the storage protocol.

11. The computing device of claim 10, wherein the second processor is configured to execute a boot sequence based on the transferred firmware.

12. The computing device of claim 10, further comprising:
    a first System-on-Chip (SoC), the first SoC comprising the first processor and the first storage device, the first storage device an embedded storage device;
    a second SoC,
    wherein the second processor is a component of a second SoC, and
    wherein the external storage device is external to the first SoC.

13. The computing device of claim 10, wherein the first processor and first storage device are configured to, in response to validating the firmware with the verification routine, initiate a boot sequence of the second processor.

14. The computing device of claim 10,
    wherein the first processor and the first storage device are configured to retrieve the firmware from the external storage device using a second storage protocol,
    the second storage protocol being different than the storage protocol executed to emulate the external storage device.

15. The computing device of claim 10, further comprising:
    a first System-on-Chip that includes the first processor,
    wherein the first processor is a boot processor that boots using secure firmware stored to a secure storage device of the first System-on-Chip.

16. The computing device of claim 10, further comprising:
    a first System-on-Chip that includes the first processor and the first storage device, the first storage device an embedded storage device,
    wherein the embedded storage device comprises non-volatile memory.

17. The computing device of claim 10, wherein to transfer the firmware requested to the second processor, the first processor and first storage device are configured to:
    transfer the firmware to the second processor via traces after verifying that the traces have not been physically compromised.

18. The computing device of claim 10, wherein the second processor comprises an application processor configured to generate artificial reality content for display at a head-mounted display.

19. An artificial reality system comprising:
a first System-on-Chip (SoC) comprising a first processor and an embedded storage device;
a storage device external to the first SoC; and
a second SoC comprising a second processor,
wherein the first processor is configured to:
- store, within the embedded storage device, firmware transferred from the storage device external to the first SoC, the firmware required to boot the second processor;
- execute a storage protocol to emulate, to the second processor, a storage device; and
- in response to validating the firmware with a verification routine, transfer the firmware required to boot the second processor from the embedded storage device to the second processor via the storage protocol and initiate a boot of the second processor, wherein the second processor is configured to obtain the firmware from the embedded storage device of the first SoC and to execute the firmware as part of a boot sequence.

* * * * *